Reissued Sept. 20, 1932

Re. 18,601

UNITED STATES PATENT OFFICE

JOHN W. BECKMAN, OF OAKLAND, CALIFORNIA

PROCESS OF EXTRACTING OILS

No Drawing. Original No. 1,698,294, dated January 8, 1929, Serial No. 714,520, filed May 19, 1924. Application for reissue filed January 7, 1931. Serial No. 507,294.

My invention has for its principal object the disintegration of certain of the cellular constituents in life cells whereby the structure of the cell or cellulous material is loosened, dissolved, disintegrated or destroyed without any substantial change in certain other constituents.

A further object is the recovery of animal or vegetable oils from corresponding animal or vegetable cellular structures by destroying the other portions of the cellular structure whereby the oil contained in the life cells is freed from entrainment and may then be readily recovered by conventional means.

By life cells I wish to be understood as referring to oil bearing cellular structure generally which is the product of growth.

A further object of my invention is the treatment of animal or vegetable oil bearing wastes whereby the oils are readily abstracted therefrom.

A further object is the abstraction of essential oils from their appropriate raw materials.

A further object is the treatment of animal, fish and vegetable matter for the production of animal feed or fertilizer, which by my process has been separated from the oils which oil residues have heretofore turned such products rapidly rancid.

By the treatment with my process these are removed leaving a residue of solid matter which when dried will maintain its purity and sweetness unimpaired.

My invention is applicable to oil bearing cellular structure, the product of life generally and is thus generally applicable to vegetables, meats, fish, and all organic cellular matter.

Other objects will appear from the specifications which follow wherein I have outlined certain preferred ways of practising the loosening, dissolving, disintegration or destruction of the cell structure, or cellulous material, whereby the cell contents are freed from entrainment.

These objects I have attained by first preparing the material in a finely divided state and mixing the material with sufficient water to make the mass of a mush-like consistency. I then mix with the mass a culture of the bacillus that produces lactic acid fermentation. I then maintain the mixture, preferably out of contact with the air by sealing with a layer of paraffine or paraffine paper or in suitable covered vessels, and at a temperature most favorable for the bacterial development and growth throughout the mass. In the case of lactic acid fermentation, this temperature I have found to be substantially 120° F.

The result of this fermentation is that the bacteria act upon a constituent, such as the maltose in the material, and weaken or destroy it, insofar as its retentive power with respect to the contents of the cellulous matter is concerned, so that the contents, as oil, of the cellulouse matter is substantially liberated. It is known that lactic-acid-producing bacteria, as the bacillus delbrucki and bacillus acidi lactici affect maltose.

During the fermentation process and bacterial growth in the mixture, I supply or add thereto a reagent to maintain the mixture substantially neutral, that is to neutralize the lactic acid in the case of lactic fermentation as the acid is formed. The presence of lactic acid inhibits the growth of the bacteria and by its neutralization the fermentation is promoted to a greater degree than would occur, where the product of the action would otherwise retard or arrest the growth.

In the case of lactic fermentation I have found carbonate of lime or carbonate of magnesium to be suitable for neutralizing the lactic acid.

The residue after the abstraction of the oil may be boiled to sterilize it, and thus arrest further action. The residue can then be dried. It is particularly valuable as an animal food, being predigested and largely soluble, carrying a large percentage of proteins as amino-acids, soluble lactic acid salts, and soluble pentoses.

I have found that the time involved in the bacterial action may be reduced by initially adding approximately 10% chloride of sodium solution. This appears also to have a solvent action on the proteins as they occur or are formed or released, thus freeing the surfaces to the action of the bacteria.

As a detailed example of my process I will describe the abstraction of the fats and oils from cocoanut.

I first take the cocoanut, dried as copra or fresh, as it comes from the tree, and grind, grate or otherwise disintegrate the mass into small particles. To 1000 parts of this material I add substantially 1 part of malt and 1 part of carbonate of magnesium as a neutralizing agent and a sufficient amount of water to make the entire mixture of mush-like consistency. The mixture is now brought to a temperature of 120° F., at which fermentation progresses rapidly, and during this period I prefer to maintain the mixture in darkness or shadow and with an exclusion of air circulation, it is not necessary to exclude the air entirely, but it is advisable to cover the mixture to prevent excessive oxidation and absorption at the surface; the bacteria being in this case what is known as anaerobic.

The mixture may be tested from time to time for acidity, and further neutralizing agent added to maintain substantial neutrality. After a period of approximately 100 to 125 hours, the cellular structure will have been destroyed and the oil contents of the cells will have therefore been freed and will accumulate at the surface and within the body of the mixture. A slow stirring during this period will facilitate the flowing of the freed oil to the surface of the mixture and prevent its entanglement in the mass.

The water that was initially added may have contained a salt as sodium chloride; or a suitable salt, as sodium chloride, may now be added. This will have the effect of increasing the specific gravity of the water portion of the treated mixture, thus promoting the gravity separation of the oil and fat globules.

The sodium chloride also appears to have a solvent action on the proteins which in some cases is advantageous as is more fully set forth in my co-pending application, Serial No. 714,519, filed May 19, 1924.

To further promote the floating of the oils water may be added preferably during the latter part of the fermentation period as a medium through which the oil particles will more readily float. In this way a very effective separation of the oil freed from the cells is secured at the top of the mixture, thus securing an initial separation of the freed oil in the same container and at the same time that the fermentation process is completed. It is to be noted that in my method the oil separation is secured at temperatures below 150° F. and which is believed to be below the critical temperature for vitamin destruction, thus retaining the vitamins in all of their purity.

After the above described treatment there will of course remain in the mass, although free from the cell structure, a considerable percentage of the oil which may be separated by any conventional method, pressing, centrifuging, etc. Separation in such cases is accomplished with much greater ease and efficiency than where the oil globules are still retained within the cell walls as heretofore. In the treatment of some cell structures which do not initially contain the ingredients most favorable to bacterial propagation it is advantageous to add hexoses in the form of cane sugar, molasses, starches or the like, depending on the individual case. These hexoses provide food and further propagation media to supplement that of the original cellular mixture and thus facilitate the dissemination of the bacteria and the bacterial action upon the initial mass.

In the specified case mentioned above, that of the treatment of copra, I have mentioned its inoculation from brewer's barley or malt as a supply of the necessary initial bacteria. There are, however, various other substances in which the lactic-acid-producing bacteria are readily available, any of which may be used with advantage, or a culture containing a predominance of the lactic-acid-producing-bacteria may be made, all in accordance with the judgment of the operator and the requirements of any individual case.

The quantity of bacteria culture employed for an inoculation is suitable over wide limits, as a very small quantity of bacteria is sufficient for the treatment of a very large mass because of its rapid growth through the mass. Thus an ounce of malt may be employed to inoculate a ton or more of the mixture, the only difference in the result being a slightly longer period of time required for the bacteria fully to disseminate through the mass and effect a complete action therein.

While in the specified case recited above, that of the treatment of copra, I have mentioned disintegration, of certain of the constituents of the material with lactic-acid-producing bacteria, from a source such as brewer's barley or malt, the desired destruction or distintegration of the cellular structure is, in addition, aided and effected by the enzyme or enzymes present in association with the bacteria or malt. It is will known that an enzyme is any substance produced by living cells which substance has a specific catalytic action. Further, it is well known that malt contains enzymes such as cytase, diastase, lipase, protease, phytase and oxidase, including proteolytic and amylolytic enzymes (Principles and practise of brewing by Sykes. Charles Griffin & Company, London 1907; Wallerstein, Journal of the Franklin Institute vols. 183, 531, 556 inc. and 715, 734 inc; Bulletin U. S. Dept. of Agriculture #183, 1915). The action which occurs, due to the presence of this enzyme, or enzymes, is, of course, the effect witnessed upon the addition and presence of the enzyme under conditions such that it acts; i. e. the hydrolysis of the proteins, starch or other materials which the enzyme has a specific action on under the conditions.

In the present instance, I do not know whether the action witnessed, i. e., the destruction of the cellulous structure of the material, as copra to liberate the contents, as the oil, is due primarily to the presence and action of bacteria, to the enzymes produced by bacteria or to the presence of an enzyme, or enzymes, in the malt. I am at present disposed to the theory that the action witnessed is the result of the presence of bacteria, and the presence of enzymes, which are produced, or are inherent, in the malt, bacteria or other living matter introduced into the macerated material, as the copra. The action on the organic cellulous matter, i. e., the destruction or disintegration of one or more of the constituents can, of course, be effected by enzymes alone as well as with the bacteria, and by enzymes without the presence of bacteria. The action can also be secured by the use of enzymes in a relatively pure state as by individual enzymes in an isolated state.

The inoculation, therefore, of the copra by the living matter, as malt or lactic-acid-producing bacteria, is, as I have previously mentioned above, to the end of securing the recovery of the contents of the cells of the cellulous structure. This recovery is effected by the disintegration of certain of the cellulous constituents in life cells, whereby the structure of the cell is loosened, dissolved, disintegrated or destroyed, without any substantial change in other constituents, such as the cell contents, as oil, normally held in the cellulous matter.

Because of the lack of a term clearly generic to those materials (oils, fats, waxes, resins, gums, gum-resins, sugars, latex, etc.) which are found in the cells of organic cellulous material and which materials can be liberated by the destruction, entire or partial, of the walls of the organic cellulous material by my invention, I am forced to adopt a purely arbitrary term for these materials. Since my invention is largely concerned with oil bearing material and the recovery of oil therefrom I impart to the word "oil", as used in the claims, a generic scope and one arbitrarily including, for the purposes of the invention, said materials, even though said materials are not oils or fats or even like oil or fats in their characteristics except that they are liquids or solids contained in minute globules in cells in organic cellulous material.

I claim:

1. The process of extracting oil from oil bearing animal and vegetable cellular substances which consists in macerating with water and inoculating the material with lactic-acid-producing-bacilli and then keeping the mixture at a temperature to promote the bacterial action and adding a reagent to maintain the mixture substantially neutral as the bacterial action progresses whereupon the oil is released from the cells, then separating the oil from the treated mass.

2. The process of extracting oil from oil bearing animal and vegetable cellular substances which consists in macerating with water and inoculating the material with the lactic-acid-producing-bacilli and then keeping the mixture at a temperature of substantially 120° F. to facilitate the bacterial action and adding a reagent to maintain the mixture substantially neutral as the bacterial action progresses whereupon the oil is released from the cells, then separating the oil from the treated mass.

3. The process of extracting oil from oil bearing animal and vegetable cellular substances which consists in macerating with water and inoculating the material with the lactic-acid-producing-bacilli and then keeping the mixture at a temperature to promote the bacterial action and substantially neutralizing the lactic acid as formed whereupon the oil is released from the cells, then separating the oil from the treated mass.

4. The process of recovering oil from oil bearing animal and vegetable substances mechanically mixed with water which consists in inoculating the said mixture with lactic acid producing bacteria adding to said mixture an alkaline-earth carbonate in amount sufficient to neutralize the acid produced during bacterial action as it is formed as the bacterial action progresses thus preventing the otherwise toxic action of the acid on the bacteria and thereafter separating the oil released by said bacterial action from said substances.

5. The process of extracting oil from oil bearing animal and vegetable cellular substances which consists in macerating with water and inoculating the material with lactic-acid-producing-bacilli, maintaining the mixture at substantially 120° F. to facilitate the bacterial action and adding a reagent to maintain the mixture substantially neutral as the bacterial action progresses whereupon oil is released from the cells and then separating out the oil.

6. The process of extracting oil from oil bearing animal and vegetable cellular substances which consists in macerating with water and inoculating the material with lactic-acid-producing-bacilli, introducing a neutralizing agent for the lactic acid which is formed, maintaining the mixture at substantially 120° F. whereupon the cellular structure is destroyed by the continued action of the bacilli and the oil is released from the cells and separates by gravity.

7. The process set forth in claim 3 wherein the neutralizing agent is magnesium carbonate.

8. The process set forth in claim 6 wherein the neutralizing agent is magnesium carbonate.

9. The process of extracting oil from oil bearing animal and vegetable cellular substances which consists in macerating with water and inoculating the material with lactic-acid-producing-bacilli, and adding a hexose to promote the bacterial growth, introducing a neutralizing agent for the lactic acid, which is formed, maintaining the mixture at substantially 120° F. whereupon the cellular structure is destroyed by the continued action of the bacilli and the oil is released from the cells and separates by gravity.

10. The process set forth in claim 9 wherein the neutralizing agent is magnesium carbonate.

11. The process of extracting oil from oil bearing animal and vegetable material which consists in macerating said material, diluting it with water until the mixture is of the consistency of mush, adding a culture of lactic acid bacteria thereto and heating it to 120° F., while adding a neutralizing agent periodically in quantities sufficient to substantially neutralize the lactic acid formed, until the cellular structure of the material is substantially destroyed and the oil freed therefrom, then adding water to thin the mixture sufficiently to permit the oil to separate by gravity therefrom, and drawing off the oil.

12. The method of releasing oil from oil bearing cellulous matter which consists in inoculating the matter with an enzyme capable of rendering water soluble at least a portion of the matter, and maintaining the matter under conditions favorable to the action of the enzyme so as to secure substantially a quick release of the oil from the matter.

13. The method of releasing oil from oil bearing cellulous matter which consists in subjecting the matter to action of an enzyme capable of rendering water soluble at least a portion of the matter, and maintaining the matter under conditions favorable to the action of the enzyme so as to secure substantially a quick release of the oil from the matter.

14. A process for recovering the liquid cell content value of organic cellulous material as fish or animal matter containing an oil or fat content in the cells thereof which comprises subjecting the material to enzyme action of bacteria, supplying a material to sustain the life activity of the bacteria, the enzyme action of the bacteria being sufficient to substantially completely destroy the retentive power of the cellular structure for the content of the cells thereby freeing the content from the cells, and then separating from the mass and recovering the cell content thus released from the cellulous material.

15. A process for recovering the liquid cell content value of organic cellulous material containing liquid in the cells thereof which comprises subjecting the material in the presence of sodium chloride to enzyme action sufficient to substantially completely destroy the retentive power of the cellular structure for the liquid content of the cells thereby freeing the liquid content of the cells, and then separating from the mass and recovering the liquid cell content thus released from the cellulous material.

16. A process for recovering the liquid cell content value of organic cellulous material containing liquid in the cells thereof which comprises subjecting the material to enzyme action of sufficient duration to substantially completely destroy the retentive power of the cellular structure for the liquid content of the cells thereby freeing the liquid from the cells, supplying to the material a neutralizing agent in sufficient amount to substantially neutralize products of the enzyme action which retard further enzyme action and then separating from the mass and recovering the liquid cell content thus released from the cellulous material.

In witness whereof, JOHN W. BECKMAN has executed this instrument this 2nd day of January, 1931.

JOHN W. BECKMAN.